(12) United States Patent
Kurosawa et al.

(10) Patent No.: US 12,474,122 B2
(45) Date of Patent: Nov. 18, 2025

(54) HEAT EXCHANGER AND METHOD FOR MANUFACTURING THE SAME

(71) Applicant: HONDA MOTOR CO., LTD., Tokyo (JP)

(72) Inventors: Yuta Kurosawa, Saitama (JP); Tsuneo Endo, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 252 days.

(21) Appl. No.: 18/128,730

(22) Filed: Mar. 30, 2023

(65) Prior Publication Data

US 2023/0314082 A1    Oct. 5, 2023

(30) Foreign Application Priority Data

Mar. 31, 2022    (JP) .................................. 2022-059117

(51) Int. Cl.
    *F28D 7/00*    (2006.01)
    *B33Y 80/00*   (2015.01)

(52) U.S. Cl.
    CPC ............ *F28D 7/0066* (2013.01); *B33Y 80/00* (2014.12); *F28F 2255/00* (2013.01)

(58) Field of Classification Search
    CPC ........ F28D 7/0066; F28D 7/0083; F28D 7/08;
            F28D 7/1684; F28D 7/1692; F28D 7/02;
            B33Y 80/00; F28F 2255/00; F28F 13/12;
            F28F 21/04; F28F 21/062; F28F 21/081;
    (Continued)

(56) References Cited

U.S. PATENT DOCUMENTS 3,335,790 A * 8/1967 Aranyi ...................... F28F 1/40
                                                       165/163
4,462,463 A    7/1984 Gorham, Jr.
10,107,555 B1  10/2018 Miller
        (Continued)

FOREIGN PATENT DOCUMENTS

EP    4033193 A1 *  7/2022   ............. B33Y 80/00
FR    3099237 A1 *  1/2021   ............... F28F 7/02
            (Continued)

OTHER PUBLICATIONS

Translation of FR3099237A1 (Year: 2021).*
Aug. 12, 2025, Translation of Japanese Office Action issued for related JP Application No. 2022-059117.

*Primary Examiner* — Tho V Duong
(74) *Attorney, Agent, or Firm* — Paratus Law Group, PLLC

(57) ABSTRACT

A heat exchanger including: a first flow path surrounded by a first flow path wall; a second flow path surrounded by a second flow path wall formed separately from the first flow path wall; and a third flow path formed by a space between the first flow path wall and the second flow path wall. The first flow path is configured to allow a first fluid to flow therethrough, the second flow path is configured to allow a second fluid to flow therethrough, and the third flow path is configured to allow a third fluid to flow therethrough. The heat exchanger performs heat exchange between the first fluid and the third fluid, and between the second fluid and the third fluid. The first flow path wall and the second flow path wall are formed such that the first flow path and the second flow path are three-dimensionally intertwined.

8 Claims, 2 Drawing Sheets

(58) Field of Classification Search
CPC ........ B22F 10/00; B22F 10/28; B29C 64/153; C04B 35/622
USPC ........................................ 165/140, 141, 156
See application file for complete search history.

(56) References Cited

U.S. PATENT DOCUMENTS

| | | |
|---|---|---|
| 2017/0131034 A1 | 5/2017 | Ribarov et al. |
| 2017/0367218 A1 | 12/2017 | Gerstler et al. |
| 2018/0187984 A1* | 7/2018 | Manzo .................... F28F 13/12 |
| 2018/0245854 A1 | 8/2018 | Sabo et al. |
| 2019/0111485 A1 | 4/2019 | Sabo et al. |
| 2020/0033070 A1* | 1/2020 | Vlahinos ........... B01F 25/43231 |
| 2021/0156339 A1 | 5/2021 | Rathay et al. |
| 2021/0245246 A1* | 8/2021 | Lara-Curzio ....... F28D 15/0233 |

FOREIGN PATENT DOCUMENTS

| | | | |
|---|---|---|---|
| JP | 2010-196626 A | 9/2010 | |
| JP | 2018-185134 A | 11/2018 | |
| JP | 2020-509329 A | 3/2020 | |
| WO | WO-2020125900 A1 * | 6/2020 | .......... B01J 19/2415 |

* cited by examiner

HEAT EXCHANGER AND METHOD FOR MANUFACTURING THE SAME

CROSS-REFERENCE TO RELATED APPLICATIONS

This application is based on and claims priority under 35 USC 119 from Japanese Patent Application No. 2022-059117 filed on Mar. 31, 2022, the entire content of which is incorporated herein by reference.

TECHNICAL FIELD

The present invention relates to a heat exchanger and a method for manufacturing the same.

BACKGROUND ART

In the related art, heat exchangers using various heat transfer methods have been widely used as devices for transferring heat between two fluids having different temperatures. For example, JP2010-196626A proposes a heat exchanger that allows a fluid to pass through a conduit having a predetermined shape to perform heat exchange.

On the other hand, in recent years, researches and developments have been actively conducted that contribute to an increase in energy efficiency in order to allow more people to access affordable, reliable, sustainable and advanced energy. In a heat exchanger, improvement in heat exchange efficiency is required in order to contribute to improvement in energy efficiency.

However, in the heat exchanger of JP2010-196626A, the conduit through which the fluid flows is formed of a porous body. However, only one fluid can flow through such a porous body, and in order to increase the fluid to be subjected to heat exchange, it is necessary to increase the size of the heat exchanger, it is necessary to increase the number of heat exchangers themselves in some cases, and there is room for improvement in the improvement of the heat exchange efficiency.

An aspect of the present disclosure relates to provide a heat exchanger in which two fluids of a first fluid and a second fluid can exchange heat with a third fluid in one heat exchanger.

SUMMARY OF INVENTION

According to an aspect of the present disclosure, there is provided a heat exchanger including: a first flow path surrounded by a first flow path wall; a second flow path surrounded by a second flow path wall formed separately from the first flow path wall; and a third flow path formed by a space between the first flow path wall and the second flow path wall. The first flow path is configured to allow a first fluid to flow therethrough, the second flow path is configured to allow a second fluid to flow therethrough, and the third flow path is configured to allow a third fluid to flow therethrough. The heat exchanger performs heat exchange between the first fluid flowing through the first flow path and the third fluid flowing through the third flow path, and between the second fluid flowing through the second flow path and the third fluid flowing through the third flow path. The first flow path wall and the second flow path wall are formed such that the first flow path and the second flow path are three-dimensionally intertwined.

DESCRIPTION OF EMBODIMENTS

Figure 1:
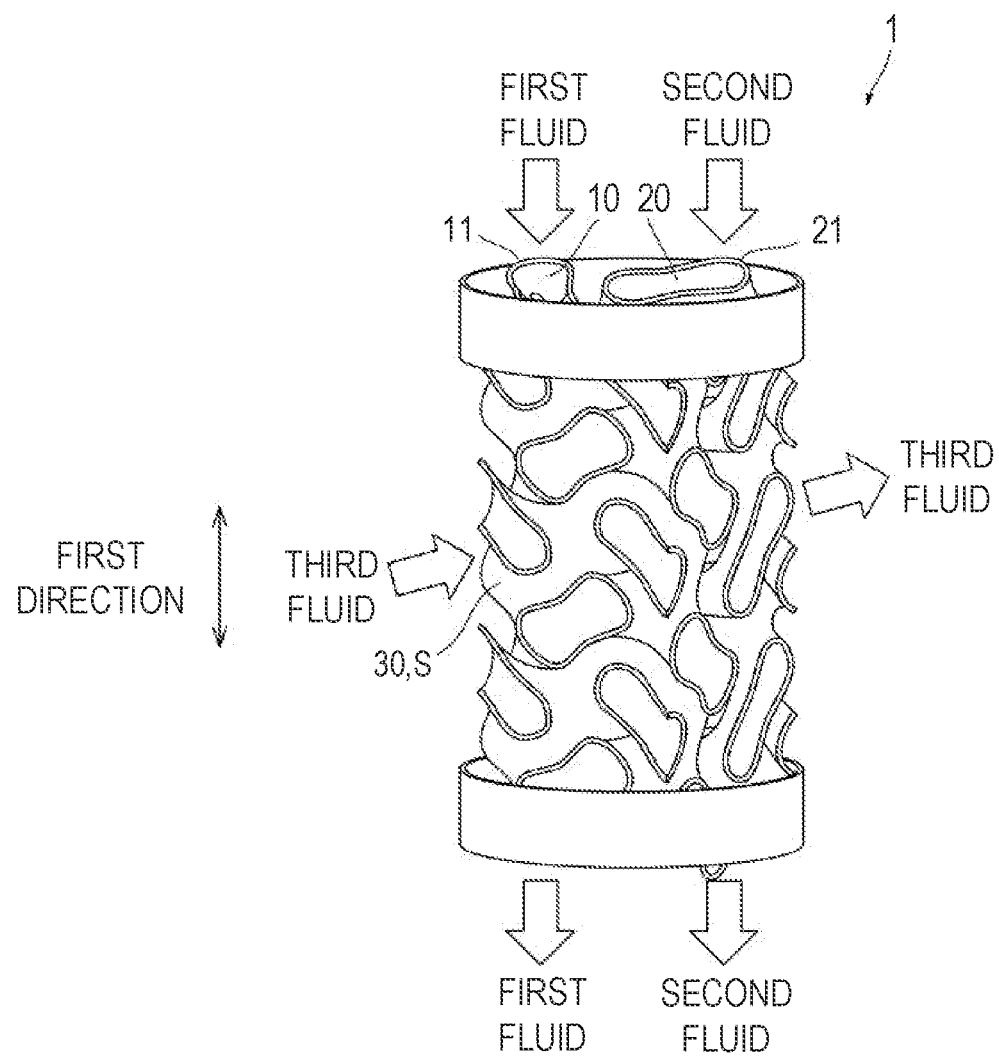
FIG. 1 is a perspective view of a heat exchanger according to a first embodiment of the present invention.

Hereinafter, embodiments of a heat exchanger of the present invention will be described with reference to the accompanying drawings. Noted that the drawings are viewed in directions of reference numerals.

First Embodiment

First, a heat exchanger 1 according to a first embodiment of the present invention will be described with reference to FIG. 1.

FIG. 1 is a perspective view of the heat exchanger 1 according to the first embodiment of the present invention. The heat exchanger 1 is a device for performing heat exchange between a first fluid and a second fluid to be cooled and a third fluid that is a refrigerant for cooling the first fluid and the second fluid. The heat exchanger 1 is mounted on a device (a vehicle or the like) on which an internal combustion engine such as an engine is mounted.

The heat exchanger 1 includes a first flow path 10 surrounded by a first flow path wall 11, a second flow path 20 surrounded by a second flow path wall 21 formed separately from the first flow path wall 11, and a third flow path 30 formed by a space S between the first flow path wall 11 and the second flow path wall 21. The first fluid flows through the first flow path 10, the second fluid flows through the second flow path 20, and the third fluid flows through the third flow path 30. The first fluid and the second fluid are, for example, exhaust gas discharged from the internal combustion engine, and the third fluid is, for example, air as a refrigerant.

The heat exchanger 1 performs heat exchange between the first fluid flowing through the first flow path 10 and the third fluid flowing through the third flow path 30, and between the second fluid flowing through the second flow path 20 and the third fluid flowing through the third flow path 30. Further, the first flow path wall 11 and the second flow path wall 21 are formed such that the first flow path 10 and the second flow path 20 are three-dimensionally intertwined.

According to such a configuration, the two fluids of the first fluid and the second fluid can exchange heat with the third fluid in one heat exchanger 1. Further, the first flow path wall 11 and the second flow path wall 21 are formed such that the first flow path 10 and the second flow path 20 are three-dimensionally intertwined. Therefore, since a contact area between the first flow path 10 and the third flow path 30 and a contact area between the second flow path 20 and the third flow path 30 can be increased, the heat exchange efficiency between the first fluid and the third fluid and between the second fluid and the third fluid can be improved without increasing the size of the heat exchanger 1.

Each of the first flow path wall 11 and the second flow path wall 21 has a gyroid structure, and a double gyroid structure is formed by the first flow path wall 11 and the second flow path wall 21. The gyroid structure is constituted by a curved surface represented by an approximate expression of $\sin a \cdot \cos b + \sin b \cdot \cos c + \sin c \cdot \cos a = 0$ using a trigonometric function when coordinates in an orthogonal coordinate system of an a axis, a b axis, and a c axis orthogonal to each other are (a, b, c).

Each of the first flow path wall 11 and the second flow path wall 21 has a gyroid structure, and a double gyroid structure is formed by the first flow path wall 11 and the second flow path wall 21. Therefore, it is possible to further increase the contact area between the first flow path 10 and the third flow path 30 and the contact area between the second flow path 20 and the third flow path 30. In addition, since turbulence is likely to occur in the first fluid flowing through the first flow path 10 and the second fluid flowing through the second flow path 20, it is possible to further improve the heat exchange efficiency between the first fluid and the third fluid and between the second fluid and the third fluid without increasing the size of the heat exchanger 1.

In the embodiment of FIG. 1, the first fluid is introduced into the first flow path 10 from one side in the illustrated first direction (a longitudinal direction of the heat exchanger 1), flows through the first flow path 10, and is discharged from the other side in the first direction. The second fluid is introduced into the second flow path 20 from the one side or the other side in the first direction, flows through the second flow path 20, and is discharged from an opposite side in the first direction. On the other hand, the third fluid is introduced from an outer peripheral surface of the heat exchanger 1 when viewed from the first direction, flows through the third flow path 30, and is discharged from the outer peripheral surface when viewed from the first direction.

According to such a configuration, since the third fluid is introduced from the outer peripheral surface when viewed from the first direction, flows through the third flow path 30, and is discharged from the outer peripheral surface when viewed from the first direction, it is not necessary to provide an introduction port for introducing the third fluid into the third flow path 30 and a discharge port for discharging the third fluid flowing through the third flow path 30, and a structure of the heat exchanger 1 can be simplified.

Second Embodiment

Next, the heat exchanger 1 according to a second embodiment of the present invention will be described with reference to FIG. 2. In the following description, the same constituent elements as those of the heat exchanger 1 according to the first embodiment are denoted by the same reference numerals, and the description thereof will be omitted or simplified.

Figure 2:
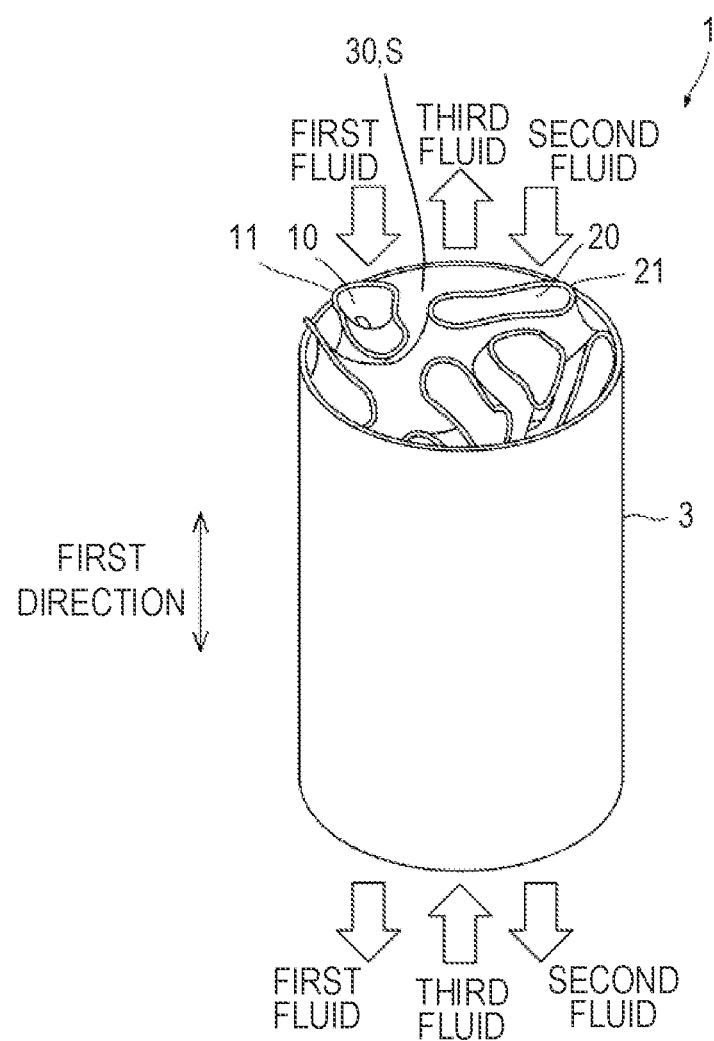
FIG. 2 is a perspective view of a heat exchanger according to a second embodiment of the present invention.

FIG. 2 is a perspective view of the heat exchanger 1 according to the second embodiment of the present invention. The heat exchanger 1 is a device for performing heat exchange between a first fluid and a second fluid to be cooled and a third fluid that is a refrigerant for cooling the first fluid and the second fluid. The heat exchanger 1 of the embodiment of FIG. 2 further includes a housing 3 that surrounds the outer peripheral surface when viewed from the first direction.

As in the first embodiment, the heat exchanger 1 includes the first flow path 10 surrounded by the first flow path wall 11, the second flow path 20 surrounded by the second flow path wall 21 formed separately from the first flow path wall 11, and the third flow path formed by the space S between the first flow path wall 11 and the second flow path wall 21. The first fluid flows through the first flow path 10, the second fluid flows through the second flow path 20, and the third fluid flows through the third flow path 30. The first fluid and the second fluid are, for example, exhaust gas discharged from the internal combustion engine, and the third fluid is, for example, air as a refrigerant or cooling water.

The first fluid is introduced into the first flow path 10 from one side (upper side in the present embodiment) in the illustrated first direction (upper-lower direction in the present embodiment), flows through the first flow path 10, and is discharged from the other side (lower side in the present embodiment) in the first direction. The second fluid is introduced into the second flow path 20 from the one side in the first direction, flows through the second flow path 20, and is discharged from the other side in the first direction. On the other hand, the third fluid is introduced into the third flow path 30 from the other side in the first direction, flows through the third flow path 30, and is discharged from the one side in the first direction. The housing 3 closes an outer peripheral portion of the first flow path 10 when viewed from the first direction, and closes an outer peripheral portion of the second flow path when viewed from the first direction.

According to such a configuration, since a flow direction of the third fluid can be made to be a counter-flow with respect to flow directions of the first fluid and the second fluid, it is possible to further improve the heat exchange efficiency between the first fluid and the third fluid and between the second fluid and the third fluid, Manufacturing of Heat Exchanger In both the first embodiment and the second embodiment, the first flow path wall 11 and the second-pow path wall 21 are formed by additive manufacturing a powdery material using a known 3D printing technique. The additive manufacturing using the 3D printing technique is a known forming technique in which a powdery material is melted by an electron beam or a fiber laser and is formed by additive solidification, and is a method in which a three-dimensionally complicated shape can be formed and a fine and dense 3D shape can be shaped. Therefore, when the first flow path wall 11 and the second flow path wall 21 are formed by additive manufacturing a powder material using the known 3D printing technique, the first flow path wall 11 and the second flow path wall 21 having a shape that is difficult to be shaped by cutting, forging, punching, or the like, which is a general processing method, can be formed with high accuracy and at low cost. The first flow path wall 11 and the second flow path wall 21 may be formed by additive manufacturing a powdery resin (for example, nylon) using the known 3D printing technique, or may be formed by additive manufacturing a ceramic powder using the known 3D printing technique.

Although the drawings show a large number of opening portions formed in an outer surface of the housing 3, the opening portions are closed during additive manufacturing.

In FIGS. 1 and 2, an introduction port of the first fluid is selected from one of opening portions of the first flow path 10 opened upward at an upper end of the heat exchanger 1, and a discharge port of the first fluid is selected from one of the opening portions of the first flow path 10 opened downward at a lower end of the heat exchanger 1. In addition, an introduction port of the second fluid is selected from one of opening portions of the second flow path 20 opened upward at the upper end of the heat exchanger 1, and the discharge port of the second fluid is selected from one of the opening portions of the second flow path 20 opened downward at the lower end of the heat exchanger 1. At the upper end and the lower end, all the opening portions other than the selected opening portions are closed during additive manufacturing, In FIG. 1, the opening portion of the first flow path 10 and the opening portion of the second flow path 20, Which are open to the outer peripheral surface of the heat exchanger 1, are all closed during additive manufacturing. On the other hand, in FIG. 2, during additive manufacturing, the entire outer peripheral surface is covered with the housing 3, and the opening portion is closed.

Although the embodiments of the present invention have been described above with reference to the accompanying drawings, it is needless to say that the present invention is not limited to the embodiments. It is apparent that those skilled in the art can conceive of various modifications and changes within the scope described in the claims, and it is understood that such modifications and changes naturally fall within the technical scope of the present invention. In addition, respective constituent elements in the above embodiments may be freely combined without departing from the gist of the invention.

In the present specification, at least the following matters are described. In the parentheses, the corresponding constituent elements and the like in the above embodiments are shown as an example, but the present invention is not limited thereto.

(1) A heat exchanger (heat exchanger 1) including:

a first flow path (first flow path 10) surrounded by a first flow path wall (first flow path wall 11);

a second flow path (second flow path 20) surrounded by a second flow path wall (second flow path wall 21) formed separately from the first flow path wall; and a third flow path (third flow path 30) formed by a space (space S) between the first flow path wall and the second flow path wall, in which the first flow path is configured to allow a first fluid to flow therethrough, in which the second flow path is configured to allow a second fluid to flow thererough, in which the third flow path is configured to a third fluid to flow therethrough, in which the heat exchanger performs heat exchange between the first fluid flowing through the first flow path and the third fluid flowing through the third flow path, and between the second fluid flowing through the second flow path and the third fluid flowing through the third flow path, and in which the first flow path wall and the second flow path wall are formed such that the first flow path and the second flow path are three-dimensionally intertwined.

According to (1), two fluids of the first fluid and the second fluid can exchange heat with the third fluid in one heat exchanger. Further, since the first flow path wall and the second flow path wall are formed such that the first flow path and the second flow path are three-dimensionally intertwined, it is possible to increase a contact area between the first flow path and the third flow path and a contact area between the second flow path and the third flow path. Accordingly, the heat exchange efficiency between the first fluid and the third fluid and between the second fluid and the third fluid can be improved without increasing the size of the heat exchanger.

(2) The heat exchanger according to (1), in which each of the first flow path wall and the second flow path wall s a gyroid structure.

According to (2), since each of the first flow path wall and the second flow path wall has the gyroid structure and are formed such that the first flow path and the second flow path are three-dimensionally intertwined, it is possible to further increase the contact area between the first flow path and the third flow path and the contact area between the second flow path and the third flow path, and further, since turbulence is likely to occur in the first fluid flowing through the first flow path and the second fluid flowing through the second flow path, it is possible to further improve the heat exchange efficiency between the first fluid and the third fluid and between the second fluid and the third fluid without increasing the size of the heat exchanger.

(3) The heat exchanger according to (1) or (2), further including:

a housing (housing 3) surrounding an outer peripheral portion of the first flow path and the second flow path when viewed from a first direction, in which the first flow path is configured to allow the first fluid to be introduced into the first flow path from a first side of the heat exchanger in the first direction, to flow through the first flow path, and to be discharged from a second side of the heat exchanger opposite to the first side in the first direction, in which the second flow path is configured to allow the second fluid to be introduced into the second flow path from the first side, to flow through the second flow path, and to be discharged from the second side, in which the third flow path is configured to allow the third fluid to be introduced into the third flow path from the second side, to flow through the third flow path, and to be discharged from the first side, and in which the housing closes the outer peripheral portion of the first flow path when viewed from the first direction, and closes an outer peripheral portion of the second flow path when viewed from the first direction.

According to (3), since a flow direction of the third fluid can be made to be a counterflow with respect to flow directions of the first fluid and the second fluid, it is possible to further improve the heat exchange efficiency between the first fluid and the third fluid and between the second fluid and the third fluid.

(4) The heat exchanger according to (1) or (2), in which the first flow path is configured to allow the first fluid to be introduced into the first flow path from a first side of the heat exchanger in a first direction, to flow through the first flow path, and to be discharged from a second side of the heat exchanger opposite to the first side in the first direction, in which the second flow path is configured to allow the second fluid to be introduced into the second flow path from one of the first side and the second side, to flow through the second flow path, and to be discharged from another side of the first side and the second side, and in which the third flow path is configured to allow the third fluid to be introduced from an outer peripheral portion of the first flow path and the second flow path when viewed from the first direction, to flow through the third flow path, and to be discharged from the outer peripheral portion of the first flow path and the second flow path when viewed from the first direction.

According to (4), since the third fluid is introduced from the outer periphery when viewed from the first direction, flows through the third flow path, and is discharged from the outer periphery when viewed from the first direction, it is not necessary to provide an introduction port for introducing the third fluid into the third flow path and a discharge port for discharging the third fluid flowing through the third flow path, and a structure of the heat exchanger can be simplified.

(5) The heat exchanger according to any one of (1) to (4), in which the first flow path wall and the second flow path wall are formed by additive manufacturing using powdery material.

According to (5), since the first flow path wall and the second flow path wall are formed by additive manufacturing of a powdery material, the first flow path wall and the second flow path wall having a shape that is difficult to be shaped 1w cutting, forging, punching, or the like, which is a general processing method, can be formed with high accuracy and at low cost.

(6) The heat exchanger according to (5),
in which the powdery material is metal powder.

According to (6), a metal heat exchanger including the first flow path wall and the second flow path wall having a three-dimensional curved surface shape, which is difficult to be shaped, can be formed with high accuracy and at low cost.

(7) The heat exchanger according to (5),
in which the powdery material is a powdery resin.

According to (7), a resin heat exchanger including the first flow path wall and the second flow path wall having a three-dimensional curved surface shape, which is difficult to be shaped, can be formed with high accuracy and at low cost.

(8) The heat exchanger according to (5),
in which the powdery material is ceramic powder According to (8), a, ceramic heat exchanger including the first flow path wall and the second flow path wall having a three-dimensional curved surface shape, which is difficult to be shaped, can be formed with high accuracy and at low cost.

(9) A method for manufacturing a heat exchanger (heat exchanger 1), the heat exchanger including:
a first flow path (first flow path 10) surrounded by a first flow path wall (first flow path wall 11);
a second flow path (second flow path 20) surrounded by a second flow path wall second flow path wall 21) formed separately from the first flow path wall; and
a third flow path (third flow path 30) formed by a space (space S) between the first flow path wall and the second flow path wall,
the first flow path being configured to allow a first fluid to flow therethrough,
the second flow path being configured to allow a second fluid to flow therethrough,
the third flow path being configured to allow a third fluid to flow therethrough, and
the heat exchanger being configured to perform heat exchange between the first fluid flowing through the first flow path and the third fluid flowing through the third flow path, and between the second fluid flowing through the second flow path and the third fluid flowing through the third flow path, the method including:
forming the first flow path wall and the second flow path wall by additive manufacturing using powdery material such that the first flow path and the second flow pater are three-dimensionally intertwined.

According to (9), two fluids of the first fluid and the second fluid can exchange heat with the third fluid in one heat exchanger. Further, since the first flow path wall and the second flow path wall are formed such that the first flow path and the second flow path are three dimensionally intertwined, it is possible to increase the contact area between the first flow path and the third flow path and the contact area between the second flow path and the third flow path. Accordingly, the heat exchange efficiency between the first fluid and the third fluid and between the second fluid and the third fluid can be improved without increasing the size of the heat exchanger.

What is claimed is:

1. A heat exchanger comprising:
a first flow path surrounded by a first flow path wall;
a second flow path surrounded by a second flow path wall formed separately from the first flow path wall; and
a third flow path formed by a space between the first flow path wall and the second flow path wall,
wherein the first flow path is configured to allow a first fluid to flow therethrough,
wherein the second flow path is configured to allow a second fluid isolated from the first fluid to flow therethrough,
wherein the third flow path is configured to allow a third fluid to flow therethrough,
wherein the heat exchanger performs heat exchange between the first fluid flowing through the first flow path and the third fluid flowing through the third flow path, and between the second fluid flowing through the second flow path and the third fluid flowing through the third flow path,
wherein the first flow path wall and the second flow path wall are formed such that the first flow path and the second flow path are three-dimensionally intertwined,
wherein an inlet of the first flow path is configured to directly receive the first fluid and an inlet of the second flow path is configured to directly receive the second fluid, and wherein each of the first flow path wall and the second flow path wall has a gyroid structure.

2. The heat exchanger according to claim 1, further comprising:
a housing surrounding an outer peripheral portion of the first flow path and the second flow path when viewed from a first direction,
wherein the first flow path is configured to allow the first fluid to be introduced into the first flow path from a first side of the heat exchanger in the first direction, to flow through the first flow path, and to be discharged from a second side of the heat exchanger opposite to the first side in the first direction,
wherein the second flow path is configured to allow the second fluid to be introduced into the second flow path from the first side, to flow through the second flow path, and to be discharged from the second side,
wherein the third flow path is configured to allow the third fluid to be introduced into the third flow path from the second side, to flow through the third flow path, and to be discharged from the first side, and
wherein the housing closes the outer peripheral portion of the first flow path when viewed from the first direction, and closes an outer peripheral portion of the second flow path when viewed from the first direction.

3. The heat exchanger according to claim 1,
wherein the first flow path is configured to allow the first fluid to be introduced into the first flow path from a first side of the heat exchanger in a first direction, to flow through the first flow path, and to be discharged from a second side of the heat exchanger opposite to the first side in the first direction,
wherein the second flow path is configured to allow the second fluid to be introduced into the second flow path from one of the first side and the second side, to flow through the second flow path, and to be discharged from another of the first side and the second side, and wherein the third flow path is configured to allow the third fluid to be introduced from an outer peripheral portion of the first flow path and the second flow path when viewed from the first direction, to flow through the third flow path, and to be discharged from the outer peripheral portion of the first flow path and the second flow path when viewed from the first direction.

4. The heat exchanger according to claim 1,
wherein the first flow path wall and the second flow path wall are formed by additive manufacturing using powdery material.

5. The heat exchanger according to claim 4,
wherein the powdery material is metal powder.

6. The heat exchanger according to claim 4,
wherein the powdery material is a powdery resin.

7. The heat exchanger according to claim 4,
wherein the powdery material is ceramic powder.

8. The heat exchanger according to claim 1,
wherein the first flow path and the second flow path do not communicate with each other.

\* \* \* \* \*